United States Patent [19]
Rand et al.

[11] Patent Number: 4,904,052
[45] Date of Patent: Feb. 27, 1990

[54] POLARIZATION PRESERVING OPTICAL FIBER AND METHOD OF MANUFACTURING

[75] Inventors: Stephen C. Rand, Agoura; Joseph A. Wysocki, Oxnard, both of Calif.

[73] Assignee: Hughes Aircraft Company, Los Angeles, Calif.

[21] Appl. No.: 300,386

[22] Filed: Jan. 23, 1989

Related U.S. Application Data

[62] Division of Ser. No. 43,565, Apr. 28, 1987, Pat. No. 4,824,455.

[51] Int. Cl.$^4$ .................................................. G02B 6/22
[52] U.S. Cl. ............................. 350/96.33; 350/96.29
[58] Field of Search .......................... 350/96.3–96.34; 65/3.11, 3.12

[56] References Cited

U.S. PATENT DOCUMENTS

| | | | |
|---|---|---|---|
| 2,772,518 | 12/1956 | Whitehurst et al. | 65/3.3 |
| 2,928,716 | 3/1960 | Whitehurst et al. | 65/3.3 |
| 3,347,208 | 10/1967 | Arridge | 118/420 |
| 3,479,168 | 11/1969 | Bird et al. | 65/3.3 |
| 3,486,480 | 12/1969 | Heywood | 118/401 |
| 3,778,132 | 12/1973 | Pinnow et al. | 350/96.3 |
| 3,788,827 | 1/1974 | De Luca | 280/687 |
| 3,877,912 | 4/1975 | Shiraishi et al. | 65/13 |
| 4,089,585 | 5/1978 | Slaughter et al. | 350/96.23 |
| 4,173,393 | 11/1979 | Maurer | 350/96.34 |
| 4,184,860 | 1/1980 | Schneider et al. | 65/33 |
| 4,407,561 | 10/1983 | Wysocki | 350/96.3 |
| 4,418,984 | 12/1983 | Wysocki et al. | 350/96.33 |
| 4,428,761 | 1/1984 | Howard et al. | 65/3.12 |
| 4,478,489 | 10/1984 | Blankenship et al. | 350/96.3 |
| 4,504,300 | 3/1985 | Gauthier et al. | 65/12 |
| 4,575,187 | 3/1986 | Howard et al. | 350/96.33 |
| 4,589,728 | 5/1986 | Dyott et al. | 350/96.3 |
| 4,630,889 | 12/1986 | Hicks, Jr. | 350/96.3 |
| 4,712,866 | 12/1987 | Dyott | 350/96.3 |

FOREIGN PATENT DOCUMENTS

| | | | |
|---|---|---|---|
| 0145030 | 6/1985 | European Pat. Off. | |
| 2826010 | of 1979 | Fed. Rep. of Germany | |
| 57-188429 | 11/1982 | Japan | 65/3.3 |
| 59-193401 | 11/1984 | Japan | 350/96.3 |
| 59-164505 | 1/1985 | Japan | |
| 63-208809 | 8/1988 | Japan | 350/96.3 |
| 7602236 | of 1976 | Netherlands | |
| 82/01365 | 4/1982 | World Int. Prop. O. | 65/3.3 |
| 82/01543 | 5/1982 | World Int. Prop. O. | |

OTHER PUBLICATIONS

T. Okoshi, "Heterodyne Type Optical Communications", Presented at 1981 International Conference on Integrated Optics and Optical Fiber Communications, San Francisco, CA, Apr. 17–29, 1981.
D. A. Pinnow et al., "Reductions in Static Fatigue of Silica Fibers by Hermetic Jacketing", Appl. Phys. Lett., vol. 34, No. 1, p. 17, (1979).
I. P. Kaminow et al., "Single-Polarization Optical Fibers: Slab Model", Appl. Phys. Lett. 34(4), Feb. 15, 1979, pp. 268–270.
V. Ramaswamy et al., "Single Polarization Optical Fibers: Exposed Cladding Technique", Appl. Phys. Lett. 33(9), Nov. 1, 1978, pp. 814–816.
Dyott et al., "Preservation of Polarization in Optical Fibre Waveguides with Elliptical Cores", Elec. Lett., vol. 15, No. 13, pp. 380–382, (1979).
K. Stenersen et al., "Small-Stokes-Shift Frequency Conversion in Single-Mode Birefringent Fibers", Optics Communications, vol. 51, No. 5, Aug. 15, 1984, pp. 121–126.

*Primary Examiner*—John D. Lee
*Assistant Examiner*—John Ngo
*Attorney, Agent, or Firm*—V. D. Duraiswamy; P. M. Coble; W. K. Denson-Low

[57] ABSTRACT

An improved polarization preserving birefringent fiber optic member is provided having cross-sectional circular cladding and core members of soft glasses. A metallic coating of an approximately circular configuration, that is offset from the axis of the core and cladding members, is provided with sufficient thickness to provide an anisotropic variation in compressional strain on the core member to create the anisotropy of the refracted index of the core member for preserving polarization characteristics. The optical fiber can be formed by heating a mechanical composite of a core rod and cladding tube, drawing the core and cladding to form a fused fiber and transporting the drawn fiber through a coating bath to provide the variation in thickness.

12 Claims, 2 Drawing Sheets

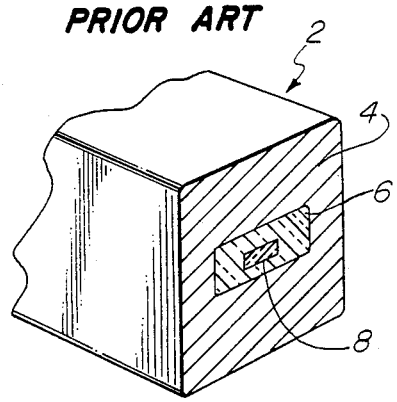
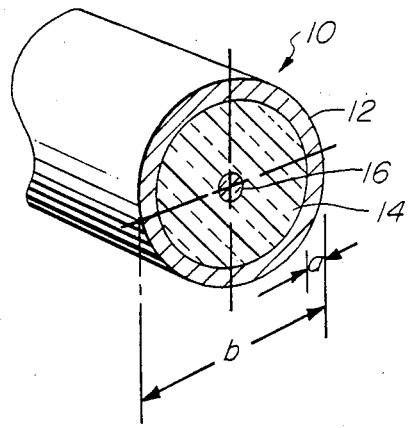
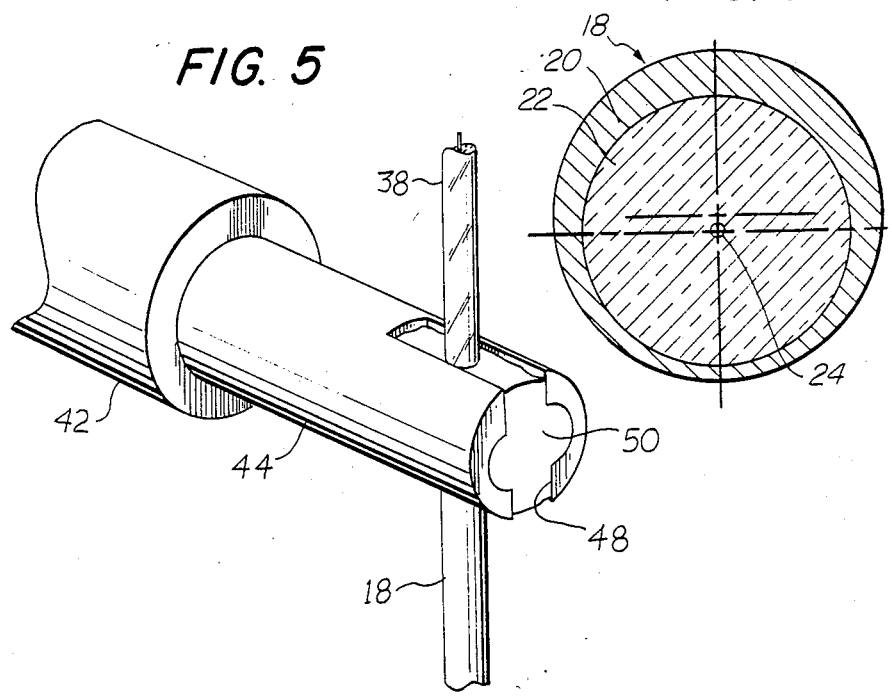

POLARIZATION PRESERVING OPTICAL FIBER AND METHOD OF MANUFACTURING

The U.S. Government has rights in this invention pursuant to a Contract No. F49620-84-C-0043, awarded by the Department of the Air Force.

This is a division of application Ser. No. 043,565, filed Apr. 28, 1987, now U.S. Pat. No. 4,824,455.

BACKGROUND OF THE INVENTION

1. Field of the Invention

The present invention is directed to an optical fiber waveguide and more particularly to a single-mode optical fiber waveguide capable of preserving polarization and a method of fabricating the same.

2. Description of Related Art

Communication systems utilizing glass transmission lines for carrying coherent or incoherent carriers in visible and near-visible spectra have become commercially feasible. Such transmission lines have generally utilized fused silica, $SiO_2$, as the media for glass transmission lines or optical fiber in both the visible and near-visible spectra. An example of such an optical transmission line can be found in U.S. Pat. No. 3,778,132.

The technical literature has also recognized the potential advantages of optical fiber waveguides that can preserve polarization. The potential advantages of a single-mode fiber waveguide able to preserve polarization are well known for use in both instruments and in long distance communications. The technical significance of heterodyne type optical fiber communication has been recognized for a considerable period of time but it has only been with the advent of low loss fibers and semiconductor lasers that commercial interest has been renewed. The ability to use a single-polarization single-mode optical fiber is of particular interest for heterodyne and/or coherent systems.

The ability to preserve polarization through the introduction of anisotropic strain birefringence in an optical fiber was discussed in a theoretical paper by *Kaminow, et al.*, "Single Polarization Optical Fibers: Slab Model," Appl. Phys. Lett., Vol. 34, No. 4, Pg. 268 (1979). This paper not only recognized the early approach to single polarization fibers through the use of an asymmetrical thick silica outer jacket of a borosilicate preform that was collapsed to form an elliptical cladding region, see *Ramaswamy, et al.*, "Single Polarization Optical Fibers: Exposed Cladding Technique," Appl. Phys. Lett., Vol. 33, No. 9, pg. 814, but further dealt with a theoretical analysis to maximize the birefringence. It suggested a slab model with suitable differential doping between the core and cladding to produce a waveguide and a relatively thick jacket to introduce strain as a result of differential thermal contraction as the fiber is drawn and cooled.

*Dyott et al.* in "Preservation of Polarization in Optical Fibre Waveguides with Elliptical Cores", Electronics Letters, Vol. 15, No. 13, Page 380 (1979), disclosed an elliptical core fiber with polarization preserving properties for long distance communications at relatively long wavelengths.

In the general area of coating optical fibers, a number of different attempts have been made to improve the life of glass fiber optical waveguides through non-metal and metal-jacketing techniques that can provide a hermetic protection of the glass fiber surface. Usually silica fibers are coated with metallic coatings to extend the lifetime of the glass fibers compared to conventionally coated plastic fibers.

U.S. Pat. No. 4,418,984 discloses a multiple coated metallic clad fiber optical waveguide comprising a core portion of high-purity $SiO_2$ or doped silica of a first index of refraction and a cladding or guiding portion of $SiO_2$ or any suitable glass material having a slightly lower index of refraction than the core material. A metallic coating of, for example, aluminum, is applied to the glass fiber during a drawing operation immediately after the fiber emerges from the furnace. As the fiber passes through a coating cup, a thin layer of the metal freezes onto the surface of the glass fiber. The dimensions of the opening in the coating cup are such that the surface tension prevents the molten metal from running out. The metallic layer provides good mechanical protection and hermetic sealing against contamination.

Other examples of such teachings in the prior art, can be found in U.S. Pat. No. 4,407,561, U.S. Pat. No. 4,089,585, U.S. Pat. No. 4,173,393, Netherlands Patent Terinzagelegging No. 7,602,236 (1976), and the German Offenlegungsschrift 2,826,010 (1979). Further advantages of hermetic jacketing of silica fibers can be found in the *Pinnow et al.* article, "Reductions in Static Fatigue of Silica Fibers by Hermetic Jacketing," Applied Physics Letter, Vol. 34, No. 1, Page 17 (1979), while a description of applying metal coating to create the hermetic seal about a glass fiber can be found in the Pinnow et al. article, "Hermetically Sealed High Strength Fiber Optical Waveguides," Transaction of the IECE of Japan, Vol. 61, No. 3, Page 171 (1978).

Frequently, the cladding and core materials were prepared as a fused preform of the component glasses prior to the drawing of the fibers. Silica-based glasses have an advantage because they can be worked and reworked without degradation. Silica-based glasses can also be prepared in a very pure form so that the impurity scattering is minimized and they are relatively immune from devitrifying.

U.S. Pat. Nos. 2,772,518, 2,928,716 and 3,788,827 disclose methods of preparing glass optical waveguide fibers with metallic coatings. U.S. Pat. Nos. 2,928,716, 3,347,208 and 3,486,480 disclose various nozzle arrangements for providing an application of a metallic coating to a glass fiber.

The currently preferred approach to fabrication of polarization preserving fibers is the use of a preform geometry which induces high birefringence in the core. In this approach, a composite cladding surrounds a circular fiber core (typically 8 $\mu$m diameter). An 80×26 $\mu$m elliptical jacket of borosilicate glass is formed around the circular core and a silica support tube forms the outer body of the composite. The borosilicate jacket material increases the thermal expansion coefficient of the composite far above that of the support. As a result of the cool-down from approximately 2000° C. where the preform is formed and elliptical shape of the jacket, a large anisotropic stress results over the core region. The direction of high compression, the short axis of the ellipse, has the higher index of refraction. The anisotropic stress adequately breaks the mode degeneracy which would occur for a simple circular core and clad fiber. This enables the decoupling of the two fundamental orthogonal modes, thereby causing the polarization to be preserved.

One of the disadvantages of this approach is that it relies on the careful preparation of a special preform from which the finished fiber is eventually drawn. This is a costly and exacting procedure.

While the prior art has provided metallic coatings on drawn glass fibers and has further recognized the desirability of anisotropic compressive strains on glass fibers to preserve polarization, there is still a need to provide an improved polarization preserving birefringent fiber optic member and an improved process of manufacturing the same.

SUMMARY OF THE INVENTION

The present invention provides an improved polarization preserving birefringent fiber optic member having a circular core member subjected to an anisotropic index of refraction. A circular cladding material surrounds the core and it is in turn covered with a circular metallic coating or jacket with a gradual variation in thickness about the cladding to provide an anisotropic compressional strain on the core member for the creation of the anisotropy of the index of refraction for the core member. The core member is formed of a relatively soft glass such as, a Schott, PK3 glass with an index of refraction on the order of 1.5213 and a cladding member is formed of a BK1 glass with a index of refraction on the order of 1.5075 for a wavelength of 5893 angstroms. An anisotropic jacket can be formed from a pure aluminum. Typical dimensions of the birefringent fiber optic member is a core in the range of approximately 2 to 10 microns in diameter, a cladding in the range of 80 to 300 microns in diameter, with an outer circular metallic jacket in the range of 5 to 35 microns in thickness and non-concentric with the core and cladding by approximately 10 microns.

This improved birefringent fiber optic member can be formed by inserting a solid rod of the core member, such as a PK3 core rod with a diameter of 0.5 mm into a precision bored thick walled cylinder of BK1 glass with an inside diameter of 1 mm and an outside diameter of 12.5 mm. This loosely constructed composite core cladding member is not fused into a preform but rather is placed directly into a drawing tower where it is drawn and coated with a metallic coating in a continual process. This process approach avoids devitrification of the cladding and the core and further can uniquely provide an anisotropic compressional strain to improve the polarization preserving birefringent characteristics of the fiber optical member. The core and the cladding material is drawn to approximately one thousandth of its original dimension and is then transported through a molten metallic bath, having a predetermined temperature gradient transverse to the transportation path, at sufficient speed to coat the drawn fiber with sufficient anisotropic or differential variation in thickness about the cladding to provide an anisotropic compressional strain when the molten metal solidifies about the cladding. The coated molten metal is cooled at ambient temperature to provide the desired variation in thickness. To provide a pristine surface for the glass fiber, the drawn fiber passes from the furnace directly into the molten bath without contacting any guides or rollers and is directly taken up on the storage drum after the appropriate solidification of the metallic jacketing. As a result, the advantages of a hermetically sealed fiber optic waveguide are provided along with an additional advantage resulting from the polarization preserving birefringent characteristics that have been induced by the anisotropic compressional strain of the metallic jacketing.

BRIEF DESCRIPTION OF THE DRAWINGS

The novel features that are considered characteristic of this invention are set forth with particularity in the appended claims. The invention itself, both as to its organization and method of operation as well as additional objects and advantages thereof, will best be understood from the following description when read in connection with the accompanying drawings in which like reference numbers refer to like parts and in which:

FIG. 1 is a perspective cross-sectional view of a slab model of the prior art for providing single polarization optical fibers;

FIG. 2 is a perspective cross-section view disclosing a prior art hermetically sealed glass fiber with a metallic jacket such as disclosed in the article, "Hermetically Sealed High Strength Fiber Optical Waveguides," Transaction of the IECE of Japan, Vol. 61, No. 3 (1978);

FIG. 3 is a prospective cross-sectional view of the improved polarization preserving birefringent fiber optic member of the present invention;

FIG. 5 is a prospective view of a metallic coating nozzle using the process of FIG. 4.

DESCRIPTION OF THE PREFERRED EMBODIMENTS

Figure 4:
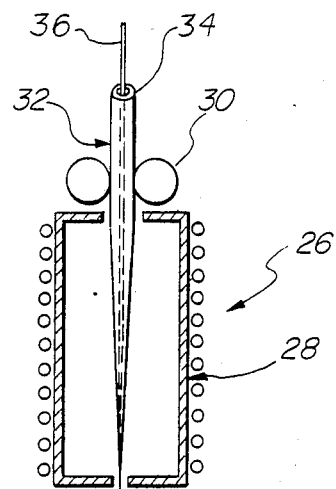
FIG. 4 is a schematic view of a production process of forming a birefringent fiber optic member.

The following description is provided to enable any person skilled in the optical fiber field to make and use the invention, and sets forth the best modes contemplated by the inventors for carrying out their invention. Various modifications, however, will remain readily apparent to those skilled in the above art, since the generic principles of the present invention have been defined herein specifically to provide a relatively economical method and apparatus for producing an improved polarization preserving birefringent fiber optic member.

Referring to FIG. 1, a prior art schematic model of a single-mode optical fiber configuration that can maintain the polarization for the propagating mode is disclosed. The waveguide includes an outer jacket 4, a cladding 6 and a core 8. The jacket can be formed of a pure silica to introduce strain as a result of the differential thermal contraction as the fiber is drawn and cooled. The core 8 and the cladding 6 can be formed from a germanosilicate, phosphosilicate, or a borosilicate material to form an appropriate waveguide. It has been suggested that sufficient anisotropic strain birefringence can be introduced into the single-mode fiber to reduce the coupling between orthogonally polarized modes to a level of sufficient utility for single-mode single-polarization propagation. It has also been proposed that with low loss high silicate glasses that optical fibers can be fabricated with a strain birefringency as large as $5 \times 10^{-4}$ corresponding to a beat length of 2 mm at a wavelength of 1 micron.

FIG. 2 discloses a schematic configuration of a hermetically sealed metallic coated graded index fiber waveguide 10 having an outer aluminum jacket 12, a glass cladding 14, and a glass core 16 with a 1% difference in refractive index between the core and the cladding. The diameter, b, of the waveguide is in the range of 100 microns while the thickness of the aluminum coating, a, is approximately 20 microns. The purpose of the aluminum coating is to hermetically coat the fiber surface with a metallic jacket and to improve the static fatigue characteristics of the optical fibers at high stress levels to render them superior to previously plastic jacketed fibers. The metal cladding is not for the purpose of increasing any propagation characteristic in the operation of the optical waveguide.

Referring to FIG. 3, the improved polarization preserving birefringent fiber optic member 18 of the present invention is disclosed. A metallic coating, such as aluminum, has an anisotropic variation in thickness and provides a jacketing 20, which coats the cladding 22 of a soft glass, such as a Schott BK1 glass having an index of refraction of 1.5075 for a wavelength of 5893 angstroms. The core 24 is also a soft glass such as a Schott BK3 glass having an index of refraction of 1.5213 for the same design wavelength.

The metallic coating can have a thickness in the range of 5 to 35 microns which will be intentionally and gradually varied about the cladding 22 to provide an anisotropic compressional strain on the core member 24. The diameter of the cladding 22 can be within the range of 80 to 300 microns, e.g. 215 microns, and the diameter of the core can be in the range of 2 to 10 microns, e.g. 5 microns.

As can be seen, the birefringent fiber optic member of the present invention comprises a circular core member 24 and a circular cladding 22.

While the preferred embodiment of the invention is disclosed with a cladding material of pure aluminum, it can be appreciated that other metals, alloys and non-metals that remain sufficiently ductile at ordinary temperatures and have a recrystallization temperature that is greater than room temperature or the anticipated use temperature for the glass fiber can be used.

It is also anticipated that other soft glasses, such as borosilicates can be utilized having the characteristics of low softening temperatures in the range of 600° C. to 1000° C. and a high thermal expansion such as above, $35 \times 10^{-7}$ in/in/°C.

Referring to FIG. 4, a schematic illustration of a drawing tower furnace and metal coating equipment for performing the process of the present invention is disclosed. The drawing tower furnace 26 includes an oven or furnace 28 that is surrounded by heating coils. A pair of pinch rollers 30 can guide a composite 32 of a cladding tube 34 and a core rod 36 into the furnace 26.

Figure 6:
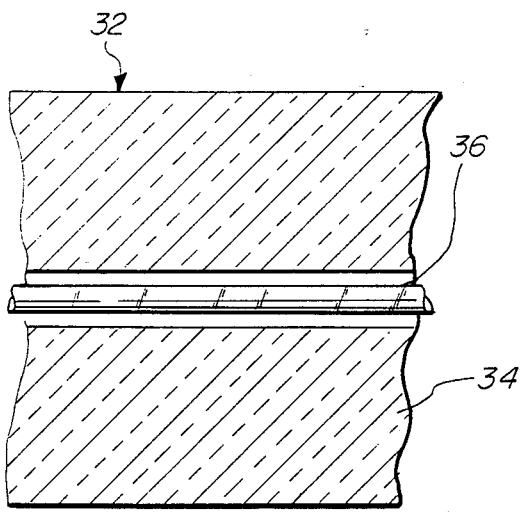
FIG. 6 is a cross-sectional view of a composite of a core rod and cladding cylinder.

As can be seen from FIG. 6, the core rod 36 is loosely fitted within the cladding cylinder or tube 34. Typically, the core rod can have an initial diameter of 0.5 mm and can be fitted within a cladding cylinder 34 having an inner diameter of 1 mm and an outer diameter of 12.5 mm. As can be readily determined, the present process does not require preparation of a fused preform of component glasses. Instead an appropriately cleaned thin rod such as a Schott PK3 glass 36 can be placed within a cleaned relatively thick walled cylinder 34 of a Schott BK1 glass. This pre-fusion composite 32 is then inserted into the furnace 28 by the pinch rollers 30 at a controlled rate to provide a reduction of approximately one thousandth in dimension with a resulting fusing of the core and cladding as a fiber 38.

The temperature of the furnace 28 is maintained in the range of approximately 700° C. to 800° C. As can be readily appreciated, this is significantly lower than the normal drawing tower or furnace temperature of approximately 2000° C. of silica-based glasses consisting of primarily amorphous $SiO_2$. This initial step of producing a mechanical composite 32 instead of producing a fused preform is also distinguishable from the normal processing of silica-based fiber optic elements that are processed through a conventional fiber drawing tower. As can be appreciated, silica-based glasses can be worked and reworked without degradation or devitrification. The present invention uses the composite structure rather than a flame-fused preform and the composite structure is placed directly into the drawing tower where it is drawn and, as will be discussed subsequently, coated in one continual process. Because cylindrical soft glass material is selected for the core and cladding, the present invention avoids reworking the soft glasses to minimize any devitrification and avoids the use of an elliptical cladding jacket.

The optical fiber 38 that has left the furnace 28 has been fused into a cylindrical composite core and cladding of the desired dimensions with a circular cross-section. The fiber 38 is then treated with a coating such as a metal to create an anisotropic of the refractive index of the core member.

Schematically shown in FIG. 4 is a crucible 40 having, at its lower bottom, a delivery tube 42 that terminates in a nozzle 44. Heating coils 46 can heat a metallic coating material, such as pure aluminum to a molten point of approximately 660° C. The molten aluminum 50 is delivered to the nozzle 44 which has an open-ended slot 48 which retains the molten aluminum 50 through a proper selection of the opening size and the metal surface tension. The position of the nozzle 44 relative to the furnace 28 is such as to permit the uncoated glass fiber 38 to cool to approximately room temperature.

The fiber 38 is passed through the molten aluminum 50 that is retained in the slot 48 at a coating speed of approximately 0.5 to 1 meter per second. When travelling through the slot 48, the fiber 38 picks up the molten metal which solidifies to the desired coating dimensions. The nozzle 44 is formed of a ceramic material and a temperature gradient exists between the position of the slot 48 adjacent to the delivery tube 42 and the position of the slot 48 adjacent the open end. It is believed that this temperature gradient is within the range of 10° C. to 20° C. across the effective length of interaction with the glass fiber 38. Thus, a traverse temperature gradient is maintained relative to the transportation path of the glass fiber 38. It is believed that by a careful selection of the transportation speed and temperature gradient, that a proper variation in thickness, which is disclosed in FIG. 3, can be determined for various forms of metallic and even non-metallic coating material. As can be seen in FIG. 3, the centric of the jacket material 20 is offset from the axis of the cladding and core material.

The thickness of the jacket can vary, for example, 15 microns at the bottom of FIG. 3 to 35 microns at the top of FIG. 3, on the vertical axis. As can also be appreciated, the circumference of the metallic jacket or coating 20 is substantially circular but off-axis from that of the drawn fiber 38. The particular choice of the soft glasses in combination with the metallic cladding are sufficient to provide a birefringent fiber optic member with polarization preserving characteristics which have resulted from the anisotropic compressional strain on the core member. The use of silica fiber glass within these dimensions is not believed to be capable of providing the same polarization preserving characteristics. The metallic coated fiber 18 is air cooled after it leaves the nozzle 44 and is subsequently taken up on a pick-up drum 52 for storage purposes.

As can be readily appreciated, both the glass furnace drawing apparatus and the metal coating crucible and nozzle are of conventional configurations and could accordingly be altered while still providing the advantages of the process of the present invention. Additionally, different types of soft glasses and different jacketing material can be utilized with a subjective determination of the variables in speed and temperature to realize the advantages of the present invention. Such calculations can be accomplished by artisans in this field once given the parameters of the present invention. Accordingly, the scope of the present invention should be measured from the following claims.

What is claimed is:

1. An improved polarization preserving elongated birefringent fiber optic member comprising:
   a cross-sectional circular core member formed of soft glass and having an anisotropic index of refraction;
   a cross-sectional circular cladding surrounding the core member, and
   a metallic coating on the cladding with a variation in thickness about the cladding to provide an anisotropic compressional strain on the core member to create the anisotropy of the refractive index of the core member.

2. The invention of claim 1 wherein the metallic coating comprises aluminum.

3. The invention of claim 2 wherein the thickness of the coating varied in the range of 5 to 10 microns.

4. The invention of claim 3 wherein the cladding member was formed of a Scott BK1 soft glass.

5. The invention of claim 1 wherein the metallic coating has an exterior substantially circular cross-section, the centroid of the metallic coating being offset from an axis of the core and cladding.

6. The invention of claim 5 wherein the cladding member is formed of soft glass.

7. The invention of claim 5 wherein the core member was formed of a Schott PK3 soft glass.

8. An improved polarization preserving birefringent fiber optic member comprising:
   a cross-sectional circular core member formed of a soft glass having an anisotropic index of refraction;
   a cross-sectional circular cladding, concentric to the core member and formed of a soft glass;
   an outer cross-sectional circular jacket coating with a variation in thickness about the cladding is positioned, non-concentric to the core member, to provide an anisotropic compressional strain on the core member to create the anisotropy of the refractive index of the core member.

9. The invention of claim 8 wherein the jacket coating is aluminum.

10. The invention of claim 9 wherein the thickness of the coating is in the range of 10 to 50 microns.

11. The invention of claim 8 wherein the core member was formed of a Schott PK3 glass.

12. The invention of claim 8 wherein the cladding member was formed of a Schott BK1 glass.

* * * * *